Patented Oct. 16, 1951

2,571,194

UNITED STATES PATENT OFFICE 2,571,194

PROCESS FOR THE MANUFACTURE OF METHACRYLIC ACID ESTERS FROM ACETONE CYANHYDRIN

Abraham Brothman, Long Island City, N. Y., assignor, by direct and mesne assignments, of one-half to A. Brothman and Associates, Long Island City, N. Y., a partnership, and one-half to Process Plants Division of Industrial Process Engineers, Newark, N. J.

No Drawing. Application November 6, 1948,
Serial No. 58,803

13 Claims. (Cl. 260—486)

This invention relates to an improved method for the manufacture of esters of methacrylic acid from acetone cyanhydrin as the principal starting material.

A large variety of processes are known for the manufacture of monomer methyl methacrylate from acetone cyanhydrin, methanol, and concentrated sulfuric acid (and/or oleums of low concentration). Fundamentally, all of these processes are similar in that they involve the formation of methacrylamide as a first step, the esterification of methacrylamide to methyl methacrylamide to methyl methacrylate monomer as a second step, and the isolation of the methyl methacrylate monomer as a third step.

In the prior art, the efficiency with which the conversion of acetone cyanhydrin to methacrylamide is managed varies, although high efficiencies have been claimed. A meticulous experimental study of the prior art (as regards the conversion of acetone cyanhydrin to methacrylamide) reveals that it has suffered, variously, from tendencies towards the side-production of polymethacrylamide and/or polymethacrylnitrile, and reactions-of-degeneration resulting, variously, in the production of products of "carbonization" and acetone as well as hydrocyanic acid.

As regards the step of the esterification of methacrylamide, a similarly meticulous experimental investigation of the prior art reveals that it has suffered, variously, from substantial tendencies towards the side-production of polymethacrylamide and/or polymethyl methacrylate and/or methacrylic acid and/or polymethacrylic acid, and/or methyl alpha-hydroxy isobutyrate and/or alpha-hydroxy isobutyryl amide, as well as reactions-of-degeneration resulting in the formation of acetone and/or carbon monoxide and/or ammonia and/or dimethyl ether.

As regards the isolation of the monomer methyl methacrylate, the prior art discloses, upon experimental investigation, the fact that from 3% to 12% of the esterification yield is lost during the various operations by which it is isolated.

Accordingly, the objects of my invention are:

1. To provide a method for the conversion of acetone cyanhydrin to methacrylamide which limits the side-reactions and reactions-of-degeneration to negligible magnitudes, and which is less dependent upon the meticulous execution of difficult processing methods than are the methods known to the prior art;

2. To provide a method for the esterification of methacrylamide which restricts the roles played by the side-reaction and reactions-of-degeneration tendencies to a minimum; and 3. To provide a technique for the isolation of the monomer methacrylate which accomplishes a virtually quantitative isolation of the monomer content of the esterification yield.

In carrying out the conversion of acetone cyanhydrin to methacrylamide, the borate ester of acetone cyanhydrin is prepared through a reaction between pyroboric acid and acetone cyanhydrin. Using an agitated reactor which I shall call reactor #1 which is previously loaded with the requisite quantity of pyroboric acid, acetone cyanhydrin is led into the reactor at such a rate that at no time during the addition is a temperature of 50° C. exceeded. After the addition of the acetone cyanhydrin is complete, the reaction system may be agitated for a period of ten minutes to two hours, depending on the extent of completion of the formation of the borate ester which is desired and the excess of pyroboric acid used. This phase of the borate ester formation is also carried out at a temperature between 30° and 100° C., preferably, at 50° C. or between 40° and 60° C. The borate ester reaction takes place in accordance with Equation (1):

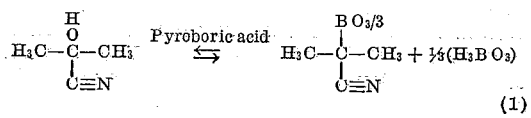

(1)

For the most efficient execution of this phase of my invention, it is necessary that the acetone cyanhydrin be as near-anhydrous as possible. A 10% excess of pyroboric acid is used in order to insure the most rapid completion of this reaction. In instances where the acetone cyanhydrin contains water, it is necessary to employ a sufficient excess of pyroboric acid to account for all of the water present. Upon completion of the borate ester formation, between 1.2 and 1.6 mols of 96% sulfuric acid for every mol of acetone cyanhydrin originally employed is added to the system. This addition is carried out at such a rate that at no time during the addition is a temperature of 60° C. to 80° C. exceeded, preferably 40° to 60° C.

Immediately following the completion of the sulfuric acid addition to the mass in reactor #1, the resultant reaction mass and a separately fed stream of water are sent through a heat exchanger of the Votator type, each at a uniform rate and in such a ratio to one another that the stoichiometric equivalence required for the conversion of the nitrile group to an amide group is observed. For the most efficient execution of this heat exchange operation, a heating up of the reaction mass to a temperature ranging between 125° C. and 150° C. is accomplished during a hold-up time in the exchanger not exceeding two minutes. This operation may be carried out at a temperature not exceeding 180° C., preferably in the range of 120° to 160° C., in a reaction time of from one to five minutes but preferably between one and two minutes.

During the addition of the sulfuric acid to the borate ester and in the subsequent processing step in the heat exchanger, the reactions set forth in Equations 2 and 3 are accomplished:

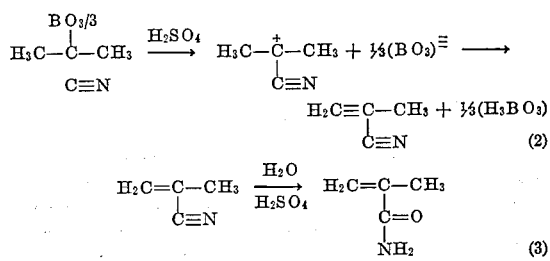

The effluent from the heat exchanger is led to a second agitated reactor which I shall call reactor #2. Reactor #2 is provided with a sufficient heat exchange capacity, via a jacket and/or internal coils, so that a continuous and for the most part instantaneous cooling of the heat exchanger's effluent to a temperature of 30° to 100° C., preferably to 60° C. is managed. For the further purposes of the operations which are carried out in reactor #2, one of the nozzles in the body of this reactor leads to a batch distillation column of the berl-saddle packed type. The column, which should have a theoretical plate equivalence of from 7 to 10 theoretical plates, is connected at its effluent end to a condenser of sufficient capacity to manage the maximum load imposed during the ensuing sequence under the conditions of a reflux ratio ranging between three and five to one. The effluent end of the condenser is connected to a distillate receiver.

The phase of the reaction which is set forth in Equation 2 is initiated in reactor #1 and is completed in the heat exchanger. The reaction set forth in Equation 3 is, of course, exclusively confined to the heat exchanger, except insofar as the water contained in the added 96% sulfuric acid is capable of carrying out the amide formation.

When the instructions given above are carried out with maximum efficiency, a near-quantitative conversion of acetone cyanhydrin to methacrylamide is achieved.

In the next phase of my invention, the conversion of the methacrylamide to the esters of methacrylic acid is accomplished. After all of the contents of reactor #1 have been passed to reactor #2 as per the above instructions, a quantity of alcohol amounting to between 1.2 and 1.7 mols of alcohol per mol of acetone cyanhydrin originally employed is added to the system in the second reactor while holding the temperature between 30° and 80° C. Here again, the addition of the alcohol is preferably so gaited that at no time during the addition is a temperature of 60° C. exceeded in reactor #2.

The next step in the esterification procedure, after the addition of the alcohol charge, consists of the addition of between 1 and 1.5 mols of water per mol of acetone cyanhydrin originally employed over a period of from one to two hours. This charge of water is added at a uniform rate over the entire mentioned period. For the period of addition of an amount of water equal to approximately one-third of a mol per mol of acetone cyanhydrin originally employed, the addition is carried out while holding the reaction mass at a temperature between 40° and 80° C., preferably at 60° C. When methanol is the alcohol employed, the addition of this initial portion of the water charge will be accompanied by the vaporization of some of the alcohol charge. This action is induced by the heat of dilution and by the heat of esterification. During this period, all of the condensate discharged from the condenser should be returned to the reactor. The refluxing operation which this implies assists in the maintaining of the prescribed reaction temperature. At the conclusion of the addition of the initial portion of the water charge, the addition of the balance of the recommended total water charge is carried out during the heating up of the reaction mass from 60° C. to a range lying between 130° C. to 135° C., or 110° to 140° C., but not exceeding 180° C. This heating up operation is carried out at a uniform rate over the period of time required for the addition of the balance of the total water charge. The execution of this heating up operation will be accompanied by the driving over of a three-component distillate consisting of the monomer ester, water, and alcohol. The mol fraction composition of the distillate, for any given ester synthesis, will vary throughout the period of the distillation. This distillate, in contra-distinction to that accompanying the initial addition of water to the system, is collected in the above-mentioned receiver member. During the entire period of distillate collection in the receiver, a reflux ratio which may lie in the range of between 3:1 and 5:1 is observed for the operation of the distillation column. The collected distillate should be instantaneously and continuously chilled to a range lying between 10° C. to 20° C. The initial distillate will be a homogeneous system, although upon continuation of the distillation operation the distillate eventually settles into a two-phase system in which (a) a "water layer" consisting of water as the principal component with monomer and alcohol as the residual and minor components, and, (b) an "ester layer" consisting of monomer ester as the principal component, with water and alcohol as the residual and minor components, are obtained. As soon as the full complement of water, as prescribed above, has been added to the system and a temperature of 130° C. to 135° C. has been achieved for the reaction mass in reactor #2, a steam distillation of the contents of reactor #2 is initiated. Water may be added to the extent of 250% of that required to hydrolyze the amide. The steam distillation is continued until a temperature of 100° C. is obtained at the top of the aforementioned distillation column.

The processing of the collected distillate in the receiver varies with the particular ester which has been synthesized. The purification procedures set down in my illustrative examples are:

(a) In the case of the procedure set down for the synthesis of methyl methacrylate, generally applicable to all instances in which the alcohol employed in the synthesis is freely miscible with water. (NOTE.—In which the alcohol demonstrates a distribution coefficient between the monomer and water favoring the extraction of the alcohol from the monomer layer within a reasonable number of water-washings of the monomer layer.)

(b) In the case of the procedure set down for the synthesis of n-butyl methacrylate, generally applicable to all instances in which the alcohol employed in the synthesis is not freely miscible with water. (NOTE.—In which the alcohol demonstrates a distribution coefficient between the monomer and water discriminating against the extraction of the alcohol from the monomer layer within a reasonable number of water-washings of the monomer layer.)

A faithful execution of the operations described above will result in a yield ranging between 80% and 95% of theoretical from the starting amount of acetone cyanhydrin employed, depending upon the particular ester synthesized. The higher limits of this yield range are achieved in the case of the methyl ester synthesis, when advantage is taken of the various measures set forth in our illustrative example for recovering all possible losses of monomer during the purification sequence. The lower limit of the yield range given above is that obtained in the instance of the n-butyl methacrylate synthesis.

Of great importance to the achievement of the yields set forth above are the following precautionary steps:

(1) An amount of copper powder amounting to approximately 1% of the charge of acetone cyanhydrin originally employed should be introduced into the borate ester of the acetone cyanhydrin prior to the addition of the sulfuric acid as a preventative against acid-catalyzed polymerization during the active synthesis steps.

(2) An amount of hydroquinone equal to ½ of 1% of the quantity of acetone cyanhydrin used should be added to the system upon commencement of the esterification operation. This is designed, again, to limit the amount of material lost through acid-catalyzed polymerization.

(3) An amount of hydroquinone equal to ½ of 1% of the expected yield of monomer should be added to the distillate receiver. This is especially important in view of the tendency of sulfur dioxide and sulfur trioxide to come over with the distillate and to become dissolved in the water component of the distillate, thereby serving as a means for promoting the acid-catalyzed polymerization of the monomer yield.

(4) The distillate receiver should be cooled so that the distillate, upon collection, is immediately reduced in temperature. This is an auxiliary preventative measure against the promotion of acid-catalyzed polymerization of the monomer during its retention period in the distillate receiver.

(5) During all of the purification steps, and especially during the batch distillation by which the completely water-free monomer is obtained, an amount of hydroquinone equal to 0.06 of 1% of the amount of monomer present should at all times be present in the processed monomer.

Relative to the pyroboric acid used in the preparation of the borate ester, this material may be regenerated from the boric acid "residue" which will be found in reactor #2 at the conclusion of the ester synthesis sequence. Since all of the pyroboric acid originally employed will be found in its stoichiometric equivalence as boric acid, the regeneration of virtually the originally employed quantity of boric acid is possible. Upon dilution of the residue in reactor #2 with a quantity of water equal to five to ten times the volume of residue, the boric acid will reappear as a slurry in the diluted residue. The boric acid may be separated from the rest of the material by a simple sedimentation operation, by centrifuging, or by any one of a number of means of separating solids from liquids. This recovered boric acid may be treated in reactor #1 so that the pyroboric acid on regeneration will be available for the successive ester synthesis.

When reactor #1 is outfitted for the regeneration of pyroboric acid, it is equipped with a vertical condenser which is attached to the reactor by way of a Bidwell-Sterling type adapter. By way of one leg of the adapter, vapors issuing from the reactor are permitted entrance to the condenser; by way of the opposite leg, condensate from the condenser is permitted to collect in a receptacle which, in some instances, is integrally connected to this leg; and, a third leg of this adapter serves commonly as the means whereby vapor is led into the adapter and the liquid overflowing from the liquid receptacle portion of the adapter is allowed to flow back to the reactor. The receptacle portion of the adapter is usually fitted with a stop-cock or valve by which the receptacle may be drained.

Using the afore-described adapter to connect the condenser to the reactor, a charge of xylol is added to reactor #1 in which there is already found the charge of boric acid wetted by the water of dilution and the residual amount of acid and ammonium sulfate contained therein. An atmospheric, pseudo-azeotropic distillation of water is then executed. A mixture of water and xylol vapors passes to the condenser by way of the adapter which we have described, is there condensed, the condensate dropping to the receptacle portion of the adapter. In the receptacle portion of the adapter, the condensate settles into two layers, a lower layer which is water, and an upper layer which is xylol. When the receptacle is sufficiently filled, an overflow of the collected xylol upper layer ensues back to the reactor. The water portion of the condensate settles to the bottom of the receptacle and is periodically tapped off. The pseudo-azeotropic distillation of the water is pursued until no further water issues from the reactor. At this point, the boric acid has been reconverted to pyroboric acid according to the equilibrium set forth in Equation 4:

$$4H_3BO_3 \rightleftharpoons 5H_2O + H_2B_2O_7 \qquad (4)$$

Equation 4, as is observed, postulates an equilibrium between boric acid on the left-hand side, and boric anhydride on the right-hand side, with this equilibrium passing through pyroboric acid as an intermediate stage between the two extreme positions. The equilibrium is upset in the right-hand direction by means of elevated temperatures. Under the temperature conditions which would prevail by the processing sequence which I have just described, the equilibrium is shifted in the direction of boric anhydride to the extent that pyroboric acid is formed. In this connection, it is in good order to record two facts relative to the general problem involved here:

1. By replacing the pseudo-azeotropic distillation of water which is described above with the fusion operation whereby the equilibrium between boric acid and boric anhydride may be driven completely towards the formation of boric anhydride, it is possible to obtain the more reactive, from the standpoint of the speed and efficiency with which the borate ester of the acetone cyanhydrin may be formed, boric anhydride. In addition to the obvious complication which is involved here, namely, the satisfactory commercial execution of the fusion operation in view of the extremely high temperatures involved (and the equipment construction problems flowing therefrom), there is the fact that the physical form in which the boric anhydride is obtained from this operation is such as to complicate the task of properly disintegrating the boric anhydride for the most efficient contacting of this material with the acetone cyanhydrin in the borate ester formation.

2. Despite the fact that the limited dehydration of the boric acid (to the form of pyroboric acid, rather than to the ultimate boric anhydride) demands the use of a larger quantity of reagent material in the formation of the borate ester, the procedure employing pyroboric acid is commended by two advantages obtained therefrom. These are: (a) the particle form in which the pyroboric acid is regenerated is of the finely divided state, corresponding to the particle size of the recovered boric acid. Since the actual borate ester formation operation is either a direct reaction between a solid and a liquid, or presupposes the dissolution of the solid in the liquid as a precondition to the reaction, the finely divided state in which the pyroboric acid is obtained, in contradistinction to the form in which boric anhydride is obtained by the fusion operation, lends itself to the more efficient execution of the borate ester formation. And (b) the reformation of pyroboric acid from boric acid involves no equipment difficulties worthy of mention.

With special reference to the use of xylol in recovering pyroboric acid from boric acid, it should be observed that any inert-to-boric-acid liquid boiling in the range from 110° C. to 190° C. may be employed if the given liquid has the characteristic of immiscibility with water, coupled with a sufficient difference in specific gravity from that of water to enable the ready and easy separation of the given liquid from the water condensate with which it travels to the receptacle portion of the adapter. Liquids satisfying the requirements of immiscibility and ready separability from water, but possessing boiling points in excess of the range noted above will involve such high stillpot temperatures as to encourage the agglomeration of particles of the pyroboric acid, thus defeating one of the main advantages of the technique described above.

In my invention, the dehydration of the cyanhydrin is accomplished in a two-step operation consisting of (1) the esterification of the alpha-hydroxyl group to form the borate ester, and (2) the acidolysis of the borate ester to form the unsaturated derivative of the cyanhydrin, the said derivative being in equilibrium with the carbonium ion form thereof according to Equation 5:

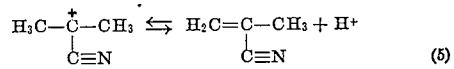

The associate product of the esterification is boric acid; and the associate product of the equilibrium mixture, from the acidolysis as per Equation 5, is boric acid. The water-of-dehydration, as such, figures only as an implicit, rather than an explicit member of the dehydration operation. Moreover, this water-of-dehydration does not essentially bind the two steps of the cyanhydrin-to-methacrylamide as per the prior art, since at no point in my dehydration procedures does it appear as an explicit factor. Its appearance as an explicit factor in my invention is in the planned and controlled conversion of the unsaturated derivative, obtained as per Equations 5 and 6, to methacrylamide, which conversion will be dealt with in its own right below.

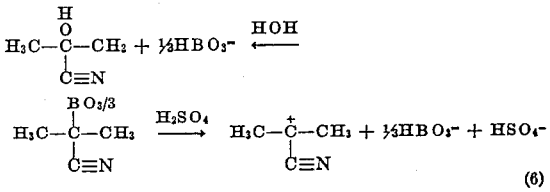

Referring to Equation 6, the easily accomplished, and virtually unidirectional acidolysis of the borate ester is so completely displaced in favor of the carbonium ion form shown therein that the subsequent step of converting the nitrile group to an amide group, by the technique of "diluting" the system with water as prescribed by the description of my invention given above, is rendered free of the danger of re-formation of the acetone cyanhydrin by the reaction shown on the left-hand side of Equation 6. With respect to the carbonium ion shown on the right-hand side of Equation 5, the danger of direct reaction of the carbonium ion form with water to re-form acetone cyanhydrin is, in view of the dependence of this reaction upon relatively dilute acidic conditions, rendered quite minimal because of the comparatively concentrated overall acid conditions existing during the nitrile-to-amide conversion. The ability in my invention, therefore, to add water to the system, as a distinct and separate procedure, makes the conversion of the nitrile group to the amide group completely dependent upon procedural control, rather than dependent upon the progress of a previous step in a series of reactions as is the case in the prior art. This independence of the nitrile-to-amide conversion from a previous step in a series of reactions provides the path to an unusually rapid conversion operation, by virtue of the fact that the time-concentration variation of the water-reactant in the nitrile-to-amide conversion system is a matter of procedural control. In its turn, the rapid conversion which is achieved in the heat exchanger portion of the equipment set-up described above permits the rapid relieving of the methacrylamide from the harmful effects of prolonged exposure to highly concentrated, hot sulfuric acid. This rapid removal of the methacrylamide from any considerable tendency of the highly concentrated sulfuric acid to exert its degradation effects thereon is accomplished partially as a result of the limited hold-up time in the exchanger, partially as a result of the continuous method of accomplishing the conversion, and, to a great extent, by the instantaneous cooling of the effluent from the heat exchanger in reactor #2.

The above outlined reasons account for the higher efficiency with which I accomplish the conversion of acetone cyanhydrin to methacrylamide. In this connection, it will be observed that the pyroboric acid actually plays the role of a catalyst facilitating the more efficient dehydration of the acetone cyanhydrin to its unsaturated derivative. The fact that the pyroboric acid may be regenerated from the boric acid residue present in reactor #2 at the conclusion of the synthesis sequence, would, from a classical point of view, reinforce its claim to its role as a catalyst in the dehydration of the acetone cyanhydrin.

The borate of acetone cyanhydrin is differentiated from all other esters previously reported in the literature (such as the acetate, carbonate, etc., esters of acetone cyanhydrin), in that it possesses an extreme lability to acidolysis and/or in that the boric acid product of the acidolysis may be easily regenerated to yield the reagent material whereby the ester is formed. In comment of the formation of the borate ester of acetone cyanhydrin, this may be formed alternatively by (a) a reaction between acetone cyanhydrin and boric anhydride, or (b) the co-heating of acetone cyanhydrin and boric acid under the condition of a third and inert material for the effecting of a pseudo-azeotropic removal of the water-of-dehydration of the boric acid—as well as by other methods known to those skilled in the art. Moreover, it is, of course, apparent that one may employ my invention in the matter of the cyanhydrin - to - methacrylamide conversion in combination with methods of esterification of the amide differing from those laid down by me. This would involve the extraction of the advantages accruing in my method of obtaining the amide form. Finally, in carrying out the acidolysis of the borate ester, it is possible not only to use a range of concentrations of sulfuric acid ranging from 75% to 100%, but oleums up to 20% as well as certain strengths of phosphoric acid and alcoholic or other non-aqueous solutions of hydrogen chloride, etc.

Turning one's attention to the special advantages offered by my invention over the prior art in the matter of the conversion of methacrylamide to the esters of methacrylic acid, it is found that:

The combination of effects achieved by the direct addition of the entire charge of alcohol to the amide in acid solution, and the gradual addition of the water which is subsequently added to the system is such as to maintain an effective excess of the alcohol reactant present at all time during the esterification, and also provides for the maintaining of the concentration of water in the reaction system at a maximum for the bulk of the esterification period. The net effect of this combination of procedures is to favor the formation of alpha-alkoxy compounds over the formation of alpha-hydroxy compounds. In view of my previously made remarks relative to the influence of alpha-alkoxy side-reaction products and the influence of alpha-hydroxy side-reaction products on the overall yield achieved, the formation of the alpha-alkoxy compounds is certainly to be preferred over the formation of alpha-hydroxy side-reaction compounds. The general condition which the above-mentioned combination of procedures strives for, namely, the maintaining of an adequate excess of the alcohol, is aided and abetted by the accompanying heat-up procedure. On an overall basis with respect to the water reagent, the heat-up procedure has the effect of limiting the dilution of the system by water through the accumulation of water-of-addition as a consequence of the direct temperature-concentration-pressure phase relationships for the sulfuric acid per se, and as a consequence of the transient atmosphere role played by the alcohol and the ester components of the distillate engendered by the heat-up. On an overall basis with respect to the alcohol reactant, the role played by the heat-up procedure is:

(a) A resolution of the interpenetrating contradictory treads on the part of the reaction rate to decrease as a function of the declining concentrations of the amide and alcohol, and to increase as a function of progressively increasing reaction mass temperatures, to the end that the overall progress of the reaction is consistent with a minimizing of losses of yield of monomer ester product through the side reactions dealt with above (thus "maximizing" the yield with respect to the alcohol reactant), and (b) A resolution of the interpenetrating contradictory trends offered by the heat-accelerated degradation effects of the concentrated sulfuric acid on the alcohol and amide reactants and the declining concentration of acid in the system (as a result of the neutralization of the acid by the ammonia produced), to the end that a maximum rate of the esterification reaction is kept consistent with a minimum loss of both reactants through degradation reactions.

In the cases of (a) and (b) above in the instance of the alcohol reactant, since (1) the partial pressure exerted by the alcohol over the system is the product of the instantaneous mol fraction of alcohol in the reaction mass and the vapor pressure it would exert were it present at the same temperature in the pure state, the vapor pressure of the pure substance is an increasing logarithmic function of the absolute temperature, and (2) the instantaneous mol fraction of alcohol residual in the reaction mass is a declining logarithmic function of time, then the partial pressure exerted by the alcohol at any given time during the course of the reaction would be a product of a diminishing function of time (the residual mol fraction) and an increasing function of time (the vapor pressure of the pure alcohol), the latter function of time arising out of the linear relationship between time and temperature during the heat-up period. The point at which the heat-up operation is commenced is guided by the overall value of the mentioned product, since the partial pressure of the alcohol over the system is the factor determining its rate of drive-over during the heat-up, in such a manner that the essential condition of maintaining a sharp excess of alcohol with respect to the amide dominates the entire course of the esterification. In view of the comments made above regarding the dependence of the acid-catalyzed polymerization side-reaction tendency upon the dilution of the system, it goes without saying that maintaining the water at or near the requirements of the esterification reaction limits the extent to which acid-catalyzed polymerizations may exert a distracting effect upon the over-all yield of monomer ester from acetone cyanhydrin. The above-named novel procedures are in contrast to the low-temperature isothermal esterifications and, on the other hand, high temperature, joint addition of water and alcohol esterifications recommended by the prior art.

Unquestionably, many variants on the procedures proposed by my invention, other than those noted by me above, can be practiced by those learned in the art. One immediate instance of such possible variants is the use of higher initial esterification temperatures when alcohols higher than methanol are used, where the use of such higher initial esterification reaction temperatures can be made consistent with the general purposes of my methods. This variant would permit the use of initial esterification temperatures, in many instances, in substantial excess over that generally given above without inducing substantial harmful effects with respect to the overall yield obtained.

The following are illustrative examples of my invention:

*Example 1.—The synthesis of methyl methacrylate monomer*

To a three-necked flask equipped with an agitator, connected to a water-cooled surface condenser by means of a Bidwell-Sterling adapter, and provided with a drop-wise addition funnel and a thermometer measuring the temperature of the liquid mass, there is added 544 g. boric acid and 3 l. xylol. The thus assembled reactor, which is also provided with a heating mantle, is heated while the contents of the reactor are agitated. The system is placed under reflux conditions under atmospheric pressure. The condensate which passes to the condenser by way of the Bidwell-Sterling adapter is condensed and dropped to the receptacle portion of the mentioned adapter. In the receptacle portion of the adapter, a settling of the xylol portion of the condensate from the water portion thereof takes place. The tapping of the receptable to relieve it of accumulated water is performed intermittently, the intervals being such that a substantial layer of xylol lies at the top portion of the receptacle, thus guaranteeing that a water-free xylol returns to the reactor. The above-mentioned reflux operation is continued until no further water comes over from the reactor. The amount of water collected will correspond to the removal of five mols of water for every four mols of boric acid originally added to the system. Upon completion of the above-described "dehydration" operation, the Bidwell-Sterling adapter and condenser portions of the set-up are removed and replaced by a standard, vacuum distillation (or "stripping") set-up consisting of a water-cooled surface condenser, a trap cooled by an acetone-Dry Ice mixture, a receiver, a manometer, etc. Using the aforementioned heating mantle, the xylol present in the reactor is driven off to dryness under optimum vacuum conditions.

Replacing the heating mantle with a water bath, there should be commenced the addition of 850 g. acetone cyanhydrin from the addition funnel at such a rate that a temperature of 50° C. is at no time exceeded during the addition operation. In such instances as this where the cyanhydrin is added to the pyroboric acid, a charge of dry benzol barely sufficient to form an agitatable slurry is charged into the reactor flask to facilitate the problem of temperature control during the addition of the initial portions of the cyanhydrin. The benzol is subsequently driven off under vacuum conditions sufficient to guarantee that the prescribed borate ester formation temperature of 50° C. is not exceeded during the stripping operation, when the borate ester formation step has been carried out. The use of the benzol charge, and the procedures attendant upon its use, are avoided by charging the pyroboric acid, as achieved by the above-described "dehydration" of pyroboric acid, to the cyanhydrin, observing the same reaction temperature limits for the borate ester formation.

Before the addition of the acetone cyanhydrin, 1% by weight of the acetone cyanhydrin used of finely divided copper powder is added to the system. The system is agitated at all times during the addition of the acetone cyanhydrin and this agitation is continued for a period of ten minutes following completion of the addition of acetone cyanhydrin, maintaining the reaction mass temperature at 50° C. throughout this operation.

Upon conclusion of the mentioned additional period of agitation, 1630 g. of 96% sulfuric acid is added to the system at such a rate that under the conditions of a water-bath cooling of the reactor, at no time during the period of addition of the sulfuric acid is a temperature of 60° C. exceeded. Immediately after the addition of the sulfuric acid to the system, the contents of the reactor are transferred to an addition funnel which forms part of the following equipment set-up. A 9 mm. diameter glass tube, 14.5 ft. long, immersed in an oil bath maintained at 175° C., is connected at one end to the addition funnel containing the previously processed reaction mass. The other end of the tube leads to a second agitated three-neck reactor. This second reactor, in addition to being provided with an ice-water cooling bath, contains by way of the neck through which the effluent from the heat exchanger enters a thermometer; and, by way of the third neck is connected via a seven to ten theoretical plate copper-spiral packed distillation column, to a water-cooled surface condenser and receiver. Also connected to the afore-described heat exchanger member by way of a Y-connection is an addition funnel containing water. Feeding the reaction mass obtained from the first sequence of operations at the rate of 100 cc. per minute, and joining this with water at the volumetric rate of 9 cc. per minute results in a mixture which is processed continuously through the heat exchanger, the effluent being collected in the second reactor. These rates of feed will result in a heating of the processed stream of 150° C. within a hold-up time in the heat exchanger of two minutes. The spatial arrangement of the feed of reagents to the heat exchanger, and of the heat exchanger to the second reactor, should be such that the finally fed materials are withdrawn from the heat exchanger by a siphoning action. To control additionally the rate of flow through the heat exchanger member, the outlet leg of the heat exchanger should be provided with a stopcock member. The desired time of stay in the heat exchanger for the processed stream should not exceed two minutes.

The effluent from the heat exchanger, upon collection in the second reactor, should be continuously and instantaneously cooled to 60° C.

After all of the reaction mass from the first sequence of operations has been passed through the heat exchanger in the manner described above, and has been collected in the second reactor, a charge of 480 g. of methanol is added to the system by way of an addition funnel which replaces the outlet leg of the heat exchanger in one of the necks of the reactor flask. The methanol is added at such a rate that under the conditions of ice-water bath cooling, at no time during the addition of the methanol charge is a temperature of 60° C. exceeded.

To the thus composed reaction system, a charge of 270 cc. of water is added over a period of one and one-half hours under the condition of a uniform rate of feed. For the interval during which an amount of water equal to one-third the stoichiometric requirements for the hydrolysis of the methacrylamide is added, the temperature of the reaction mass should be maintained at 60° C. Thereafter, the temperature of the reaction mass is raised from 60° C. to an upper range lying between 130° C. and 135° C., at a uniform rate. This heat-up operation is accomplished within the interval of time required for the addition of the balance of the water charge mentioned above. The charging of the first portion of the water charge will be accompanied by a refluxing of methanol from the reactor system. All of the condensate from the system during this period should be returned to the reactor. The heat-up operation described above will be accompanied by the driving over of a three-component distillate. Upon completion of the addition of the water charge, maintaining the temperature of the reaction mass between 130° C. and 135° C., there is passed steam into the reaction mass for the purposes of accomplishing a steam distillation of the residual monomer contained in the reaction mass. This steam distillation should be pursued until a temperature of 100° C. is obtained at the top of the column. For the entire period during which distillate take-off is practiced, a reflux ratio lying in the range between 3:1 and 5:1 should be employed.

The initial portions of the condensate, upon collection, will be a homogeneous system. Thereafter, a two-phase distillate is taken over. Ultimately, a separation of the entire collected distillate into two phases occurs. The upper layer of the two-phase distillate collected in the receiver contains water as the principal component, and methanol and monomer methacrylate as the minor components. The lower layer contains monomer methyl methacrylate as the major component, and water and methanol as the minor components.

Upon completion of the distillate collection as prescribed above, the collected distillate is treated in the following manner.

The first step in the processing of the distillate consists of the removal of the upper layer. The lower layer is then successively washed three times, each time with a volume of water equal to the volume of the lower layer. At the conclusion of the third washing operation, a monomer ester saturated with water at the temperature at which the washing operation is carried out, is obtained. This monomer ester is set aside for processing in conjunction with those other portions of monomer yield which are obtained as follows:

Each of the water-washes used to wash the originally obtained lower layer are combined with the upper layer obtained in the distillate receiver. The consequent mixture is subjected to a distillation. In this distillation, water and the monomer ester are separated from the alcohol. Upon virtual completion of the alcohol removal, a resting of the water will reveal monomer floating as an upper layer on the water residue. The monomer layer is carefully separated from the water residue and is then added to the previously washed monomer layer. The water layer which is left in the stillpot, after the distillation of methanol from the ternary system obtained from the joining up of the washings from the main monomer portion and the initial upper layer, is then set aside for use as the water requirements of the next amide conversion and the next esterification operation.

After the two portions of monomer ester have been joined up, the total monomer yield is subjected to an operation in which the temperature of the crude monomer is lowered to —10° C. The low temperature achieved in this operation may range between —5° C. and —20° C. A monomer obtained as per the above instructions, and subjected to the temperature lowering operation just described, will develop a crop of ice crystals. These ice crystals are then separated from the main mass of the monomer. The separation of the ice crystals from the main mass of the monomer yield may be accomplished by either filtration or by centrifuging, but in any case care must be taken to prevent a rise in the temperature of the system, during the separation operation, above a high limit of —5° C. This precaution limits the amount of water which may re-enter the monomer during the separation operation through a rise in the temperature of the processed system. In this manner, a monomer containing that amount of water which constitutes saturation of the monomer, at —5° C. is achieved.

A sufficient amount of monomer will occlude to the ice crystals to warrant the setting aside of the ice crystals until they have thawed, at which time a layer of monomer will appear above the water layer. It is in good order to saturate the water layer resulting from the thawing operation with a salt as a means of "salting out" monomer contained therein. The monomer thus recovered should be added to the next batch prepared at the point where the monomer resulting from the successive manufacturing operation is subjected to the "freezing-out" of water as described above.

The "de-watered" monomer which is obtained from the "freezing-out" operation previously described may then be subjected to a batch distillation to obtain an absolutely water-free monomer. This distillation should be carried in the following manner:

Depending upon the preference of the operator, either an atmospheric or a vacuum distillation may be pursued. In any case, the precise boiling point of the monomer at the condition of pressure used should be noted. Upon subjection of the monomer to the distillation operation, all of the material coming over, under efficient distillation conditions, beneath the precise boiling point of the monomer should be rejected to a separate receiver. This rejection operation should continue for a sufficient period to insure the cleansing of the distillation column against any hold-up of reject material. This will ensure that the monomer obtained subsequently is completely waterfree and in a state sufficient for the requirements of the polymerization processes to which the monomer is usually subjected subsequently.

The rejected distillate should be set aside and, as is the case with the monomer recovered from the thawed ice crystals, should be joined up with the succeeding batch of monomer prepared at the point where the monomer portions from the manufacturing operation are subjected to the "freezing-out" operation.

*Example 2.—The synthesis of n-butyl methacrylate.*

The preparation of the methacrylamide-in-sulfuric acid-solution takes place as per the instructions given above in the case of the manufacture of methyl methacrylate monomer.

My description, therefore, starts with the collected methacrylamide solution in the second reactor, present there at a temperature of 60° C. To the quantity of amide solution resulting from the use of 850 g. of cyanhydrin as a starting material, there is added 1,136 g. of n-butanol by way of an addition funnel, to the methacrylamide solution. The temperature of the resultant reaction mass is allowed to rise to 85° C. during the period of the n-butanol addition. To the thus obtained reaction mass, a charge of 216 g. of water is added over a period of one and one-half hours at a uniform rate. During the addition of the first portion of the water charge, namely that portion amounting to ⅓ of the stoichiometric requirements for the hydrolysis of the methacrylamide, the temperature of the reaction mass is held at 85° C. Thereafter, the temperature is raised at a uniform rate over the balance of the period for the addition of the rest of the water charge to a final range lying between 130° C. and 135° C.

Upon conclusion of addition of the total recommended water charge, a steam distillation is pursued again until a temperature of 100° C. is recorded at the top of the distillation column. All of the distillation operations are carried out under a reflux ratio lying between 3:1 and 5:1. The theoretical plate equivalence of the column and the basic arrangement of members in connection with the reactor is the same as that employed in the case of the synthesis of monomer methyl methacrylate.

In this case too, the final collected distillate will be found to be a two-phase system, consisting of a water layer and a monomer layer. The water layer is removed and the monomer layer is subjected to two successive washes with equal volumes of water. The water layer initially collected, and the wash-waters are combined and are then subjected to a batch-type distillation.

Using a 20-theoretical plate laboratory column of the Vigrieux type which is connected at the top through a Bidwell-Sterling adapter to a vertical condenser, the combined water washes and original water layer are subjected to a pseudo-azeotropic distillation, using xylol as the "third" component of the system, in which the water component of the original system is eliminated through the constant tapping of the Bidwell-Sterling adapter receptacle. The water which is thus eliminated from the system may become a component portion of the water-reagent feed to a succeeding esterification operation. The residual butanol-butyl methacrylate-xylol mixture is fractionated to separate the butanol and butyl methacrylate from the xylol. The thus obtained butanol-butyl methacrylate mixture is set aside to be joined up at a later point with the monomer layer which is processed as per the following instructions.

The monomer layer, which consists of butyl methacrylate and butanol, is subjected to a "freezing-out" operation in accordance with the instructions given in the case of the processing of the monomer layer from the methyl methacrylate synthesis. Upon removal of the ice crystals from the monomer layer processed in this manner, a virtually water-free butanol-butyl methacrylate system is obtained. Joining the thus processed monomer layer with the previously obtained butanol-butyl methacrylate mixture (obtained from the processing of the water layer-water washes mixture), the total thereby achieved is subjected to a fractionation operation to isolate a dry butyl methacrylate monomer.

I claim:

1. In a process for synthesizing methacrylic acid esters in which acetone cyanhydrin is converted to methacrylamide, the methacrylamide reacted with an alcohol to produce the ester, and the resulting ester recovered, the improvement comprising reacting acetone cyanhydrin with pyroboric acid under substantially anhydrous conditions to form a borate ester of the acetone cyanhydrin, mixing the said borate ester with a concentrated mineral acid, adding water to the resulting mixture to produce a reaction mixture containing methacrylamide, and mixing an alcohol with said reaction mixture and converting the methacrylamide to the methacrylic acid ester of the alcohol.

2. A process as claimed in claim 1 in which the acetone cyanhydrin is reacted with the pyroboric acid at a temperature between 30° and 100° C.

3. A process as claimed in claim 1 in which the acetone cyanhydrin is reacted with the pyroboric acid at a temperature between 40° and 60° C.

4. A process as claimed in claim 1 in which the acetone cyanhydrin is reacted with the pyroboric acid in the presence of an inert liquid adapted to provide a slurry medium for the pyroboric acid.

5. A process as claimed in claim 1 in which the borate ester is mixed with the concentrated mineral acid at a temperature not exceeding 110° C.

6. A process as claimed in claim 1 in which the water is added to the mixture of the borate ester and concentrated mineral acid in a stoichiometrical quantity equivalent to that of the original content of acetone cyanhydrin, and passing the resulting mixture in a stream through a reaction zine maintained at a temperature between 120° and 180° C.

7. A process as claimed in claim 1 in which a stream of water and a stream of the mixture of the borate ester and concentrated mineral acid are joined together and passed in a stream through a tubular reaction zone, heating the mixture passing through the reaction zone to a temperature between 120° and 160° C., and immediately cooling the reaction products leaving the reaction zone to a temperature between 30° and 100° C.

8. A process as claimed in claim 1 in which the alcohol is mixed with said reaction mixture at a temperature between 30° and 80° C., and in a quantity sufficient to react with all of the methacrylamide contained in said reaction mixture.

9. A process as claimed in claim 1 in which water is gradually added to the reaction mixture containing the alcohol in a reaction zone maintained at a temperature not exceeding approximately 80° C., and while refluxing all distillate produced from vapors evolved in the reaction zone back into the reaction zone.

10. A process as claimed in claim 1 in which the methacrylic acid ester is recovered as a distillate, chilling the distillate to a temperature below 0° C. for the purpose of reducing the level of water saturation in the methacrylic acid ester and thereby freezing the water content of the distillate to ice crystals, and separating the ice crystals from the methacrylic acid ester.

11. A process for synthesizing methacrylic acid esters from acetone cyanhydrin, which comprises reacting a quantity of acetone cyanhydrin with a compound selected from boric anhydride and pyroboric acid under substantially anhydrous conditions at a temperature of approximately 50° C. to produce a borate product, mixing from 1.2 to 1.6 mols of strong mineral acid with said borate product per mol of starting acetone cyanhydrin at a temperature of between 60° and 80° C. to produce an acidified mixture, mixing approximately one mol of water per mol of starting acetone cyanhydrin with said acidified mixture and heating the resulting mixture to a temperature between 120° and 160° C. for a period of from 1 to 5 minutes to produce a reaction mixture containing a quantity of methacrylamide approximately equal to that theoretically producible from the starting quantity of acetone cyanhydrin, cooling said reaction mixture to a temperature of approximately 60° C., mixing an alcohol with the cooled reaction mixture and reacting the alcohol with the methacrylamide to produce the methacrylic acid ester of the alcohol, and recovering said ester.

12. A process as claimed in claim 11 in which the alcohol is mixed with the cooled reaction mixture while maintaining the temperature at approximately 60° C., gradually adding water to the mixture of the alcohol and said reaction mixture over a period of from twenty to forty minutes while maintaining said 60° C. temperature, and thereafter continuing the gradual addition of water for a period of from forty to eighty minutes while gradually raising the temperature to 130° to 135° C.

13. A process as claimed in claim 1 in which said reaction mixture is formed at a temperature between 120° and 160° C. in a reaction period of from one to five minutes, cooling the reaction mixture to a temperature of approximately 60° C., mixing an alcohol with the cooled reaction mixture while maintaining the temperature at approximately 60° C., gradually adding water to the mixture of the alcohol and said reaction mixture over a period of from twenty to forty minutes while maintaining said 60° temperature, and thereafter continuing the gradual addition of water for a period of from forty to eighty minutes while gradually raising the temperature of the reaction mixture containing the alcohol to a temperature of from 130° to 135° C.

ABRAHAM BROTHMAN.

REFERENCES CITED

The following references are of record in the file of this patent:

UNITED STATES PATENTS

| Number | Name | Date |
| --- | --- | --- |
| 2,042,458 | Crawford | June 2, 1936 |
| 2,056,771 | Crawford | Oct. 6, 1936 |
| 2,265,785 | Wainwright | Dec. 9, 1941 |
| 2,356,247 | Kirk | Aug. 22, 1944 |
| 2,373,464 | Dittmar | Apr. 10, 1945 |
| 2,416,756 | Jilk | Mar. 4, 1947 |

FOREIGN PATENTS

| Number | Country | Date |
| --- | --- | --- |
| 405,699 | Great Britain | Feb. 12, 1934 |
| 466,504 | Great Britain | May 28, 1937 |